United States Patent [19]
Baker

[11] 3,741,032
[45] June 26, 1973

[54] COLLAPSIBLE STEERING COLUMN ASSEMBLY

[75] Inventor: Donald J. Baker, South Bend, Ind.

[73] Assignee: The Bendix Corporation, South Bend, Ind.

[22] Filed: Sept. 27, 1971

[21] Appl. No.: 184,149

[52] U.S. Cl. .................................. 74/492, 24/279
[51] Int. Cl. ............................................. B62d 1/18
[58] Field of Search ............... 74/492, 493; 24/279, 24/243 B

[56] References Cited
UNITED STATES PATENTS

| | | | |
|---|---|---|---|
| 912,097 | 2/1909 | Erickson | 24/279 |
| 2,863,203 | 12/1958 | Dalpiaz | 74/279 |
| 3,491,614 | 1/1970 | Saunders et al. | 74/493 |

*Primary Examiner*—Milton Kaufman
*Attorney*—Ken C. Decker et al.

[57] ABSTRACT

A collapsible steering column of the type used on motor vehicles is arranged to telescope upon impact. The steering column is provided with inner and outer telescoping polygonally shaped shafts axially slidable one within the other. The inner and outer shafts are held in rotational and axial driving engagement by clamping means which preloads the respective shafts to withstand normal axial impact but which permits the shafts to collapse axially when the force of impact of a collision exceeds a predetermined safe value.

12 Claims, 7 Drawing Figures

PATENTED JUN 26 1973 3,741,032

INVENTOR.
DONALD J. BAKER
BY Ken C. Decker
ATTORNEY

COLLAPSIBLE STEERING COLUMN ASSEMBLY

BACKGROUND OF THE INVENTION

Public clamor for greater safety in the automotive vehicle has forced a retreat from the conventional steering shaft which is so constructed as to not collapse upon vehicle collision. This non-collapsible type of steering shaft was responsible for many chest and head injuries to the driver brought about by subjecting him to the full force of impact in a collision.

Accordingly, presently constructed steering shafts are of the collapsible or energy absorbing types which may, for example, take the forms shown in U.S. Pats. Nos. 3,318,170; 3,434,369; 3,444,753; and 3,491,614 assigned to the common assignee for this invention.

The collapsible steering assembly herein disclosed is proposed as offering advantages over the prior patented devices.

SUMMARY OF THE INVENTION

The principal object of the invention is to provide a collapsible steering assembly for an automotive vehicle, including two telescoping polygonal shafts equipped with a preloading device having two corresponding polygonal openings respectively through which said shafts project in frictional engagement.

Another object of the invention is to provide a collapsible steering shaft assembly having two polygonally shaped shafts which are telescopically arranged in last-free torsional relationship.

A further object of the invention is to provide a collapsible steering shaft assembly which is simple to manufacture and easy to assemble.

A still further object of the invention is to provide clamping means at the junction of two telescoping shafts which furnishes independent preloading on the respective shafts for controlling both torsional and axial response between the shafts.

An important object of the invention is to provide a clamping device which comprises two deflectable arms located at the junction of two overlapping telescoping shafts so that one of the arms is frictionally attached to one of the shafts and the other arm is frictionally attached to the other shaft.

Another important object of the invention is to provide a collapsible telescoping steering shaft assembly with adjustable means for preselecting the axial loading required to cause the shaft assembly to collapse.

The above and other important objects and features of the invention will be apparent from the following description of the device taken in connection with the accompanying drawing, which form a part of this specification.

DETAILED DESCRIPTION OF THE INVENTION

Figure 1:
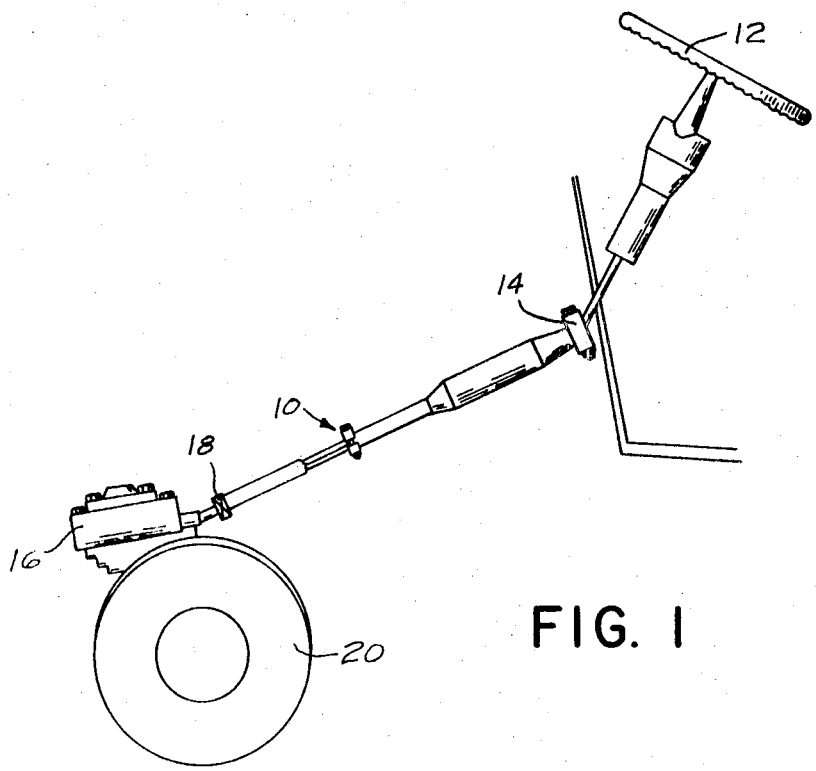
FIG. 1 shows diagrammetically the collapsible steering shaft assembly of the present invention associated with the dirigible wheels of a vehicle.

Referring to FIG. 1, a collapsible steering shaft assembly designated by the numeral 10 is shown associated with other elements of a vehicle steering system, including a steering wheel 12, appropriately connected to the upper end of the assembly 10 through a coupling mechanism 14 and a steering gear 16 drivably secured to the lower end of the assembly 10 through a coupling 18. The steering gear 16 is operatively connected to dirigible wheels 20 in a manner well known to those skilled in the art.

The steering shaft assembly 10, in accordance with the principles of the present invention, comprises an outer shaft 22 and an inner shaft 24. The outer shaft 22 is generally tubular in construction to telescopically receive the inner shaft 24. End portion 23 of the outer shaft 22 is formed with a polygonal bore to slidably accept a corresponding polygonal end 25 of the shaft 24. This telescopic fit of the polygonal shaft ends 23 and 25 provides for torsional rotation of the shafts as well as relative axial displacement between the inner and outer shafts. However, because of the manufacturing difficulties encountered in holding the desired tolerances between the shafts, it is impractical to maintain the shafts free of back lash. Moreover, this same problem in manufacturing renders it equally impractical to control the telescoping shaft tolerances to the degree necessary to establish accurately a predetermined axial preload which when exceeded will collapse the shaft assembly 10. The axial preload on the shafts 22 and 24 should be controlled within an acceptable range to insure the proper functioning of the steering shaft assembly.

To provide a lash free connection between the shaft ends 23 and 25 and also establish an axial preload therebetween which when overcome will collapse the shaft assembly 10, clamping means 26 is located at the junction between the shaft ends 23 and 25 where shaft overlap occurs. The clamping means 26 comprises a clamp member 27 having two parallel axially aligned arms 28 and 30 formed with polygonal openings 32 and 34 therein respectively to matingly receive the polygonal shaft ends 23 and 25. The arms 28 and 30 are joined at their upper end portions by a common support which is divided into two U-shaped sections 36 and 38 separated by a space or slot 40. The space 40 allows for relative lateral movement or adjustment between the common support sections 36 and 38 to thereby regulate the preload on the shafts 22 and 24 as applied by the arms 28 and 30.

For adjusting the axial preload of the shaft assembly, means is operatively connected to the common support sections and comprises a bolt 42 which extends through the U-shaped sections 36 and 38 so that head 44 engages a side of the common support section 36 and nut 46 engages a side of the common support section 38 opposite from the head 44. Washers 48 and 50 are located respectively between the head 44 and common support 36 and between the nut 46 and common support 38, to facilitate drawing together of the sections 36 and 38 upon tightening the nut 46.

Figure 2:
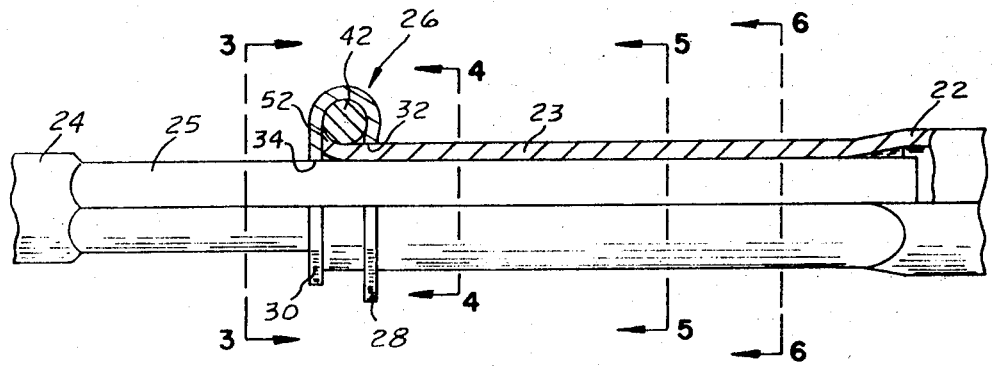
FIG. 2 is a fragmentary enlarged view partly in longitudinal section of the shaft assembly of FIG. 1.

The clamping means 26 is held in assembled relationship to the outer shaft 22 by means which includes the bolt 42, one side of which abuts the so support which carries the arm 28 and the other side of which engages a nib 52 formed in the outer surface of the end 23 of the outer shaft 22. The nib 52 is centrally located on the shaft 29 as to register with the slot 40 when assembling the clamp to the shaft. That is, the clamp member 27 is mounted to the end 23 of the shaft 22 by aligning the opening 32 in the arm 28 with the shaft end 23 so that the slot 40 registers with the nib and then sliding the clamp along the shaft, to the right, as viewed in FIG. 2, until the bolt 42 can be passed between the nib 52 and the inner side of the arm 28. This locks the clamp to the end of the shaft 22 for the assembly of the inner shaft 24.

Figure 3:
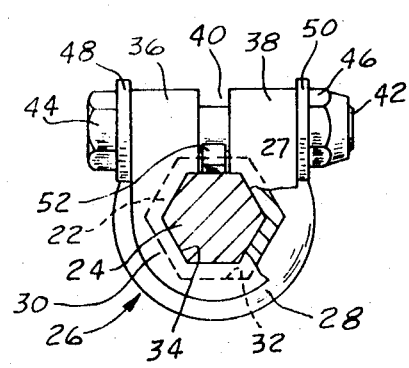
FIG. 3 is a sectional view taken on the line 3—3 of FIG. 2.

As shown in FIG. 3, the hexagonal openings 32 and 34 of the arms 28 and 30 respectively conform precisely to the geometry of the shaft ends 23 and 25 which are in telescopic engagement. This geometric relationship between the sides of the openings 32 and 34 and the respective shaft ends 23 and 25 produces the desired gripping action on the shafts by the arms 28 and 30 upon threading the nut 46 on the bolt 42. The arms 28 and 30 are preloaded respectively to the shaft ends 23 and 25. That is, the arm 28 is independently preloaded to carry a preselected axial force of the shaft 22 and the arm 30 is preloaded to carry the axial force of the shaft 24. When this preloading is exceeded, as might happen in a collision, the shafts telescope, thus absorbing the greater amount of energy which otherwise would have been directed into the steering wheel.

Figure 4:
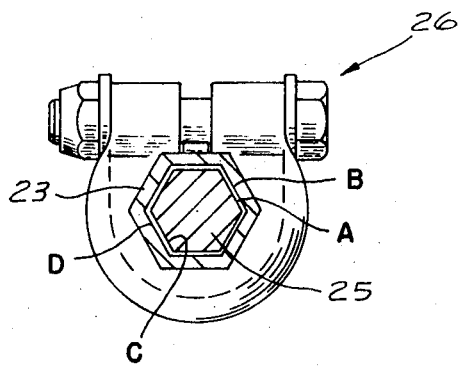
FIG. 4 is a sectional view taken on the line 4—4 of FIG. 2 showing the relative shaft positions without torsional loading.
Figure 5:
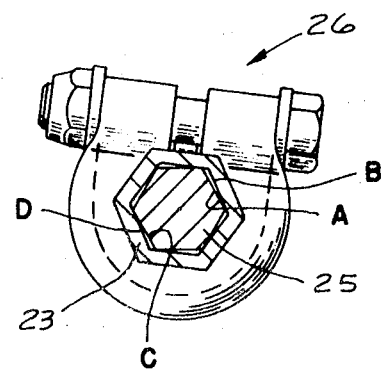
FIG. 5 is a sectional view taken on line 5—5 of FIG. 2 showing shaft relationship upon clockwise rotation of the shaft assembly.
Figure 6:
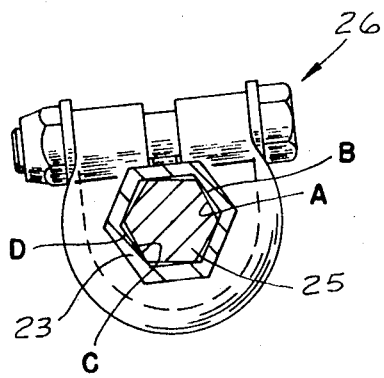
FIG. 6 is a sectional view taken on the line 6—6 of FIG. 2 showing shaft relationship upon counterclockwise rotation of the shaft assembly.
Figure 7:
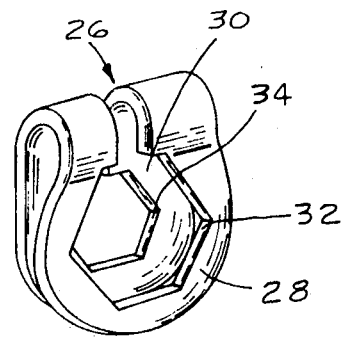
FIG. 7 is a view in perspective of the clamp shown removed from the telescoping shafts.

In FIG. 4 it will be seen that the sides of the telescoping shaft ends are parallel and concentric during non-steering conditions, i.e., no torsional loading on the shafts. This shaft relationship is illustrated by the spacing between the sides AB and CD of the shafts. The spacing or tolerance is exaggerated for illustrative purposes. In practice this spacing would be held to practical manufacturing tolerances. Upon initial rotation of the shafts, torsional loading is taken through the clamping means 26. The clamp 27 is constructed with some flexibility or spring rate built into it by design which resists torsional stressing up to a given value. When this torsional stress value is exceeded, so as to overcome the energy stored in the clamp, the arms 28 and 30 are caused to deflect laterally. As the torsional stressing or loading on the shafts is increased, lateral deflection of the arms 28 and 30 increases. This torsional loading on the shafts required to estabish engagement between the shaft sides AB and CD for example, depends on such factors as the dimensions of the clamp 27, alloy of steel, etc. These factors are, of course, taken into account at the time the design is approved. As seen in FIG. 5, the shafts are subjected to clockwise torsional stressing or loading in excess of the force built into the clamp so that the arms 28 and 30 have been distorted or flexed laterally with respect to each other, thus establishing driving engagement between the two shaft ends. FIG. 6 illustrates the relative shaft positions during counterclockwise rotation. The torsional loading of the shafts in the counterclockwise direction has exceeded the built-in forces in the arms 28 and 30 of the clamp 27 resisting rotation of the shafts 22 and 24, so that the opposed sides AB and CD of the hexagonal shafts are rotated into driving engagement. Obviously, for both directions of shaft roation, the torsional loading is now being transferred directly between the shafts 22 and 24.

While this invention has been described in connection with a specific embodiment, it will be understood by those skilled in the art that changes may be made in structure and arrangement of parts without departing from the spirit of the invention. By way of example only and not limited to the specific illustration, shafts having geometrical shapes other than hexagonal are appropritae in the practice of the invention.

I claim:

1. A collapsible steering shaft assembly, which comprises:
   an outer shaft having an end with a polygonal bore;
   an inner shaft having a polygonal end corresponding to said bore and telescopically received within said bore;
   said inner and outer shafts having axial sliding movement therebetween and torsional backlash; and
   means connected to said inner and outer shafts for controlling the axial movement and torsional backlash of said shafts;
   said means including a support and two parallel axially aligned arms integrally suspeneded from said support, one of said arms is operatively connected to one of said shafts and the other of said arms is operatively connected to the other of said shafts to establish axial preloading of the respective shafts.

2. A collapsible steering shaft assembly, as defined in claim 1, wherein said arms have lateral flexibility with respect to the shaft axes so as to respond to torsional loading.

3. A collapsible steering shaft assembly, as defined in claim 1, wherein said telescoping shafts have overlapping ends, and said means for controlling the axial movement and torsional backlash of said shafts is located at the junction of said overlapping ends.

4. A collapsible steering shaft assembly, as defined in claim 1, wherein said means further includes means for adjusting the axial preload of the shafts to a predetermined value so that the assembly will collapse when the axial force along the shafts exceeds this value.

5. A collapsible steering shaft assembly, as defined in claim 4, wherein said support comprises two U-shaped sections separated by a space and said means for adjusting the axial preload includes a bolt which extends through the U-shaped sections.

6. A collapsible steering shaft assembly, as defined in claim 5, whrein one of said shafts is formed with a nib thereon in registry with the space between said sections and said bolt engages with nib on one side and abuts said support on the other side.

7. A collapsible steering shaft assembly, as defined in claim 6, wherein said nib is integral with the outer shafts and is located at the junction of overlap between said telescoping shaft ends.

8. A collapsible steering shaft assembly, as defined in claim 1, wherein said two parallel axially aligned arms are in the form of a clamp with polygonal openings for receiving the respective corresponding polygonal shaft ends.

9. A collapsible steering shaft assembly, as defined in claim 8, wherein said polygonal ends of said shafts are formed with flat sides.

10. In a collapsible steering shaft assembly;
    an outer shaft and an inner shaft;

one end of said inner shaft having a polygonal cross section;

one end of said outer shaft having a polygonal bore receiving the polygonal end of said inner shaft; and clamping means operatively connected to said inner shaft and to said outer shaft for controlling relative axial movement and torsional backlash between said shafts;

said clamping means including a support, a pair of substantially parallel arms extending from said support, one of said arms being operably connected to said inner shaft, the other arm being operably connected to said outer shaft.

11. The invention of claim 10:

said arms having openings therein with polygonal sides for mating engagement respectively with their corresponding inner and outer shafts, said openings being substantially coaxial.

12. The invention of claim 11:

said support member being divided into two sections separated by a space, said arms being connected to each of said sections;

a device adjustably connected between the sections of said support to adjust the width of said space and therefore the force vented on said shaft by said arms to thereby control the force required to move one of said shafts relative to the other shaft.

* * * * *